United States Patent

[11] 3,547,463

| [72] | Inventor | Walter S. Eggert, Jr.<br>Huntingdon Valley, Pa. |
| --- | --- | --- |
| [21] | Appl. No. | 741,578 |
| [22] | Filed | July 1, 1968 |
| [45] | Patented | Dec. 15, 1970 |
| [73] | Assignee | The Budd Company<br>Philadelphia, Pa.<br>a corporation of Pennsylvania |

[54] COLLAPSIBLE AUTOMOBILE BODY STRUCTURE AND METHOD OF MAKING SAME
3 Claims, 4 Drawing Figs.

[52] U.S. Cl...................................................... 280/106, 293/52
[51] Int. Cl....................................................... B62d 21/00
[50] Field of Search........................................... 280/106; 293/52F; 52/720, 573, 223, 232

[56] References Cited
UNITED STATES PATENTS

| 3,171,669 | 3/1965 | Barenyi......................... | 280/106 |
| 2,870,871 | 1/1959 | Stevinson..................... | 293/52F |
| 3,437,367 | 4/1969 | Blank............................. | 293/52F |

Primary Examiner—Philip Goodman
Attorneys—Thomas I. Davenport, Edward M. Farrell, Alford L. Trueax, Jr. and William R. Nolte ABSTRACT: A vehicle frame structure for providing progressive collapse of a vehicle's body during collision without the high stress of the initial contact. The structure for such a reaction being provided by prestressed frame components.

INVENTOR.
WALTER S. EGGERT, JR.
BY

ATTORNEY

COLLAPSIBLE AUTOMOBILE BODY STRUCTURE AND METHOD OF MAKING SAME

With the increased emphasis on safe motor vehicles, the present invention has been developed to protect vehicle passengers from the initial shock of impact. Heretofore it has been the general practice to design special structure, such as "V" notches, holes and flutes in structural member, to provide progressive collapse of vehicle during a collision, It is an object of this invention to show a method and means of constructing automobile structures as either components or assemblies that have and maintain predetermined collapse characteristics.

This invention is concerned primarily with the separate underframe of a conventional vehicle body or the stub front side rails of a monocock or unitized vehicle body. The previous art attempted to provide a progressively collapsible vehicle front end by specially designed structures for collapse in a preferred direction. Another object of this invention is to convert a typical frame structure to one having a progressive collapse characteristic.

Referring now to the drawing, there is shown:

Figure 1:
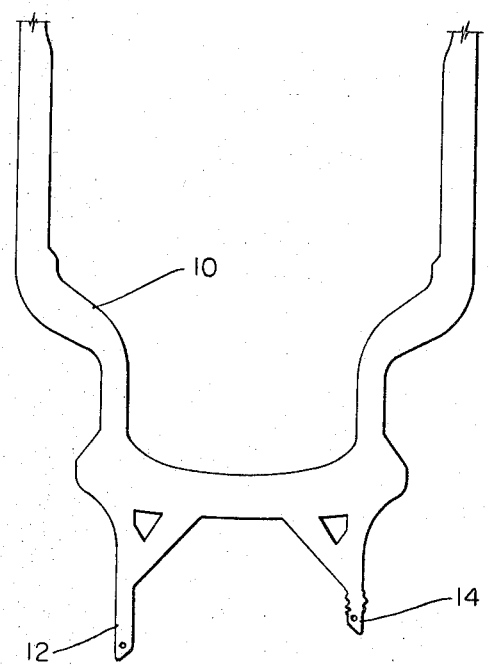
FIG. 1 is a plan view, with portions broken away, of a front end of a typical separate underframe for a vehicle body having one bumper support extension in the unstressed condition and the other bumper support extension in the prestressed or finished condition.
Figure 2:
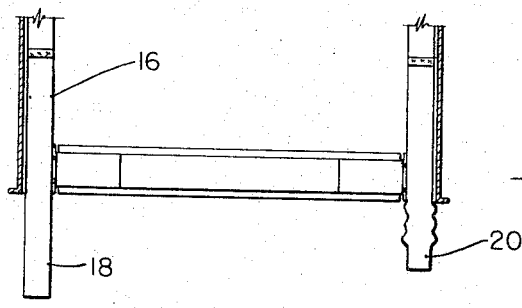
FIG. 2 is a plan view, with sections broken away, of the front end of an unitized body showing the one stub rail in the unstressed condition and the other stub rail in the prestressed condition.

Referring now to the drawings, as best seen in FIG. 1, a vehicle from 10 for supporting an automobile body of a separate underframe type vehicle is shown with one front bumper side member extension 12 shown in the unstressed condition and the other front bumper side member extension 14 shown in the prestressed condition. In FIG. 2, the front-end structure 16 of a unitized or monocock vehicle is shown with one stub rail 18 in the unstressed condition and the other stub rail in the prestressed condition.

Figure 3:
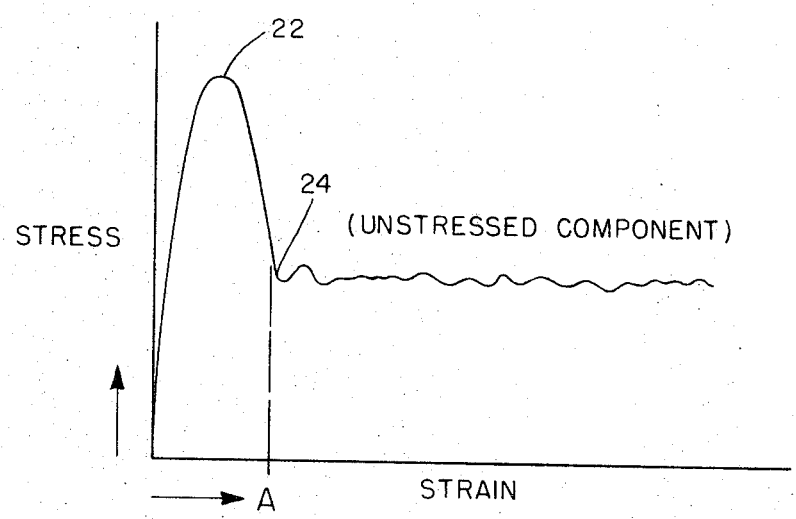
FIG. 3 shows a typical stress-strain curve for a front-end collision of an automobile.

It was found that in a typical automobile front-end collision, a stress-strain curve such as that shown in FIG. 3 was formed. Referring to FIG. 3, as the stress or force per unit area increases the strain or change per unit length remains small until the metal of the automobile reaches the upper yield point at 22. From point 22 the metal starts to yield until the lower yield point 24 is reached and the continued application of a constant stress force is absorbed by the yielding of the metal along a substantially constant stress level as the front of the vehicle crumples. The intent of this invention is to eliminate the initial high stress required to begin the controlled collapse of the front body structure of an automobile so that the stress-strain curve will begin at point A.

Figure 4:
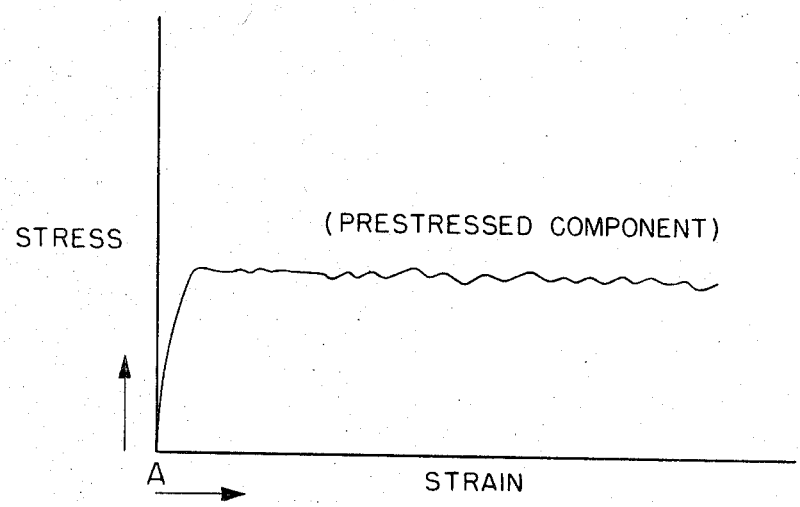
FIG. 4 shows a stress-strain curve for a front-end collision of an automobile having prestressed components of this invention.

It was found that automobile components and assemblies could be prestressed under controlled conditions until reapplication of stress to the automobile will provide a curve as shown in FIG. 4, where the stress-strain curve begins at point A.

To accomplish the desired characteristics of FIG. 4, the underframe of FIG. 1 or the front stub rails of a unitized body, FIG. 2, are initially fabricated longer than required for final assembly. Then the frame is held in jigs and fixtures which prestresses the components in a preferred direction, thus eliminating the high-stress portion 22 of the curve shown in FIG. 3 and producing a component of the proper length. By initially upsetting or straining the component or assembly in the direction in which the expected collision force will be applied, the prestressed component or assembly may be used in an automobile body without harmful effects to the automobile body structure. However, once the prestressed components or assembly incurs forces due to collision, the structure collapses under a constant stress force so as to provide the preferred shock collision characteristics of the stress-strain curve in FIG. 4.

Thus, it can be seen by reference to FIG. 3, and FIG. 4, the prestressed structure has eliminated the high stress required in the unstressed components to provide collapse of the body structure without the initial high stress or shock.

This method may be applied to individual components as well as the assembled underframe.

I claim:

1. A frame in a vehicle body structure for absorbing impact forces and having preferred directional collapse characteristics, said frame having a pair of longitudinally extending substantially parallel side frame members, a plurality of crossmembers extending between said side frame members and having each end of each crossmember secured to the adjacent side frame member, each of said side frame members having an end section extending beyond the last crossmember, said end sections having end portions for supporting a bumper and intermediate portions extending between said end portions and the last crossmember attaching point, said intermediate portions having buckled areas stressed by application of a longitudinal compressive force to plastically deform said intermediate portion beyond the elastic limit of the material and form said end frame sections to the proper length, and said buckled intermediate portions having longitudinal collapse characteristics when exposed to forces above the yield point of the material.

2. The frame as claimed in claim 1 wherein said side frame members have a substantially U-shaped cross section.

3. The frame as claimed in claim 1 wherein said side frame members have substantially rectangular cross sections and said buckled intermediate portions extend inwardly and outwardly of the planes of the rectangular sides of the frame members.